US009479096B2

(12) United States Patent
Heynlein et al.

(10) Patent No.: US 9,479,096 B2
(45) Date of Patent: Oct. 25, 2016

(54) PHASE CURRENT REGULATION IN BLDC MOTORS

(71) Applicant: Melexis Technologies NV, Tessenderlo (BE)

(72) Inventors: Jan Heynlein, Erfurt (DE); Thomas Freitag, Plaue (DE); Christian Paintz, Erfurt-Kerspleben (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 14/531,224

(22) Filed: Nov. 3, 2014

(65) Prior Publication Data

US 2015/0145455 A1 May 28, 2015

(30) Foreign Application Priority Data

Nov. 25, 2013 (GB) .................................. 1320718.8

(51) Int. Cl.
*H02P 1/00* (2006.01)
*H02P 6/18* (2016.01)

(52) U.S. Cl.
CPC ................. *H02P 6/18* (2013.01); *H02P 6/182* (2013.01)

(58) Field of Classification Search
CPC ............ H02P 6/182; H02P 6/18; H02P 8/34; H02P 23/0036; H02M 7/537
See application file for complete search history.

(56) References Cited

U.S. PATENT DOCUMENTS

| 6,121,736 | A | 9/2000 | Narazaki et al. |
| 8,461,789 | B2 | 6/2013 | Paintz et al. |
| 2005/0275362 | A1* | 12/2005 | Yamamoto .......... H02P 23/0081 318/400.18 |
| 2010/0301791 | A1 | 12/2010 | Watanabe et al. |
| 2013/0069574 | A1 | 3/2013 | Fricker |

FOREIGN PATENT DOCUMENTS

EP 0993108 A2 4/2000

OTHER PUBLICATIONS

Great Britain Search Report from GB Application No. GB1320718.8, May 19, 2014.
Extended European Search Report from EP Application No. 14194460.3, Jan. 11, 2016.

* cited by examiner

*Primary Examiner* — Karen Masih
(74) *Attorney, Agent, or Firm* — Workman Nydegger

(57) ABSTRACT

A method is provided for determining a phase current direction and a zero-crossing moment of the phase current in a sinusoidally controlled brushless direct current motor. The brushless direct current motor comprises a coil per phase and the phase of the brushless direct current motor is driven by a half bridge driver. The half bridge driver comprises a high side field effect transistor and a low side field effect transistor. The method comprising the following steps: measuring the drain source voltage over the high side field effect transistor and low side field effect transistor, and determining the zero crossing moment of the phase current by determining the current direction based on the measured drain source voltages and by determining the moment the current changes direction.

9 Claims, 11 Drawing Sheets

PHASE CURRENT REGULATION IN BLDC MOTORS

FIELD OF THE INVENTION

The present invention relates to the field of brushless direct current (BLDC) motors. More specifically it relates to a device and method for controlling and monitoring the operation of BLDC motors. In particular, embodiments of the present invention apply to sensorless control of sinusoidally driven BLDC motors in the special aspect of phase current alignment towards BEMF voltage.

BACKGROUND OF THE INVENTION

BLDC motors are today widely used in automotive as well as non-automotive applications. As opposed to classic brushed DC Motors, a BLDC motor always needs to have driving electronics. The driving electronics provide a rotating electric field in the stator coils, by applying a switching sequence of driving waveforms to these stator coils. The rotor itself is built up with permanent magnets, which will follow the rotating magnetic field of the stator coils.

In order to synchronise the position of the rotor with the position of the rotating field generated by the stator coils, it is required that the driving electronics are aware of the rotor position. This knowledge about the rotor position allows the driving electronics to correctly switch between the driving waveforms.

The rotor position information might be provided by a sensing unit such as for instance a Hall effect sensor or a rotary encoder, or can be derived in a sensorless way out of the voltage/current information on the motor terminals, for instance by measuring the back-electromotive force (BEMF) voltage in the undriven coils. These latter implementations eliminate the need for separate position sensors, and are therefore often called sensorless controllers.

In the past, several methods and systems have been identified for controlling BLDC motors with as feedback mechanism the BEMF voltage. For instance, U.S. Pat. No. 8,461,789 describes the calculation of a time T in response to the determination or estimation of a back EMF zero crossing event for a phase. The time T is representative of the desired absolute maximum value of the phase current. Current samples are taken by the current sampling unit symmetrically centred around T, and the values of the samples are input into an error function to calculate an error function value. The calculated error function value is used for calculating an adjustment value for the phase angle of the driving voltage profile that will minimise the absolute value of the error function. It is a disadvantage of the method described that relatively high filtering and calculation efforts are required. Also RAM usage is high. Moreover, the system provides limited dynamics because of the high calculation efforts.

Hence there is room for improvement in systems and methods for controlling and monitoring BLDC motors, bypassing the disadvantages mentioned.

SUMMARY OF THE INVENTION

It is an object of embodiments of the present invention to provide good systems and methods for controlling and monitoring the operation of BLDC motors.

The above objective is accomplished by a method and device according to embodiments of the present invention.

It is an advantage of embodiments of the present invention that they provide a good implementation, for instance better than prior art implementations, with limited, e.g. less than in prior art, required calculation performance.

It is an advantage of embodiments of the present invention that they give a higher dynamics. This means for example that higher speed changes are possible than for instance in prior art implementations or that the motor can react faster to load changes on the motor shaft than for instance in prior art implementations. This is advantageous in applications like for instance oil pumps where a given oil pressure must be reached in a very short time or which need to be regulated to a given torque value.

It is an advantage of embodiments of the present invention that they allow the BEMF sensing when the phase current is minimal, for instance substantially zero or even zero. In embodiments of the current invention the phase current during the BEMF sensing is less than 50% of the maximum phase current. In embodiments of the current invention, at higher speed of the BLDC motor, the phase current during the BEMF sensing is less than 10% of the maximum phase current. This leads to good, e.g. improved, or even optimal, EMC and acoustical noise behaviour.

In a first aspect, the present invention provides a method for determining a phase current direction and a zero-crossing moment of the phase current in a sinusoidally controlled brushless direct current motor. The brushless direct current motor comprises a coil per phase, wherein the phase of the brushless direct current motor is driven by a half bridge driver comprising a high side field effect transistor and a low side field effect transistor. The method comprises the following steps:

measuring the drain source voltage over the high side field effect transistor and low side field effect transistor, and determining the zero crossing moment of the phase current by determining the current direction based on the measured drain source voltages and by determining the moment the current changes direction.

Measuring the drain source voltages over the high side field effect transistors and low side field effect transistors for each phase allows to determine the direction of the current through the phase. It is an advantage of embodiments of the present invention that the zero-crossing moment T1 of the phase current can be determined by identifying the moment when the current changes direction.

Determining the zero crossing of the phase current according to embodiments requires only to determine the current direction based on the drain source voltages over the high side field effect transistor and over the low side field effect transistor whereby a change in direction determines the zero crossing moment of the phase current. Therefore it is an advantage of embodiments of the present invention that the required computation power is small compared to methods where the phase current needs to be reconstructed out of a total current measurement. It is an advantage of embodiments of the present invention that the zero-crossing of the phase current can be determined without requiring calculation intensive algorithms. It is for example not required to reconstruct the complete phase current. Therefore less processing power as well as less RAM is required when comparing with other methodologies (for example the ones reconstructing the phase current).

It is an advantage of embodiments of the present invention that determining the zero-crossing moment of the phase is robust against non-linearities of the system. It is an advantage of embodiments of the present invention that the zero-crossing moment of the phase can be determined with a limited amount of filtering or sorting, when comparing with prior art solutions, of the measured data. Therefore, it is an advantage of embodiments of the present invention that the settling time caused by the filtering is reduced when comparing with prior art solutions. A software filter algorithm may be used, which increases reliability of the measured values used to generate interpolated values.

In a method according to embodiments of the present invention, determining the zero crossing moment of the phase current may comprise filling a current direction indication table with the current direction for each measurement.

It is an advantage of embodiments of the present invention that the current direction is stored for a sequence of measurements. This allows to better determine the zero-crossing moment of the phase current. Indeed, storing the direction of the current in a current direction indication table allows to average out noise artefacts occurring at the zero crossing of the phase current.

In a second aspect, the present invention provides a method for driving a sinusoidally driven brushless direct current motor. The brushless direct current motor comprises a coil per phase, wherein the phase of the brushless direct current motor is driven by a half bridge driver comprising a high side field effect transistor and a low side field effect transistor. The method comprises the following steps:

applying a driving waveform to each field effect transistor of each phase wherein each of the driving waveforms has an undriven period, determining the zero-crossing moment of the phase current using a method according to embodiments of the first aspect of the present invention, determining a delay between the zero crossing moment of the current through the coil and a zero crossing moment of a back-electromotive force voltage over the coil, adjusting the driving waveforms with the determined delay such that the zero crossing of the phase current substantially corresponds with the zero crossing of the back-electromotive force voltage. The phase difference between the BEMF voltage and the phase current is in its worst case between 20 and 60 degrees. In embodiments of the present invention the resulting phase difference, after adjustments, between the BEMF voltage and the phase current is between 0 and 10 degrees, preferably between 0 and 5 degrees.

A method according to embodiments of the present invention may furthermore comprise, before the step of determining a delay between the zero crossing moment of the current through the coil and a zero crossing moment of a back-electromotive force voltage over the coil, measuring the back-electromotive force voltage during an undriven period of the phase, and determining the zero crossing moment of the back-electromotive force voltage of the phase based on the measured back-electromotive force voltages.

By identifying the zero-crossing moment T1 of the phase current, and by identifying the zero-crossing moment T2 of the back-EMF voltage, the phase current and the back-EMF voltage can be aligned. It is an advantage of embodiments of the present invention that the back-EMF voltage and the phase current can be aligned through a method according to embodiments of the present invention as this allows to run the motor in an energy efficient mode. In embodiments of the present invention an undriven period is provided in the driving waveform of the high side and low side field effect transistor. During this undriven period the back-EMF voltage is measured. It is an advantage of embodiments of the present invention that the undriven period is aligned with the zero-crossing of the phase current. By opening the BEMF measurement window when the phase current is changing its polarity, current spikes and fly back voltage pulses are avoided. This will lead to an optimal EMC and acoustical noise behaviour and improve the reliability of the BEMF measurements.

The undriven period defines the measurement window during which the BEMF voltage can be measured. It is an advantage of embodiments of the present invention that a good alignment between the phase current and the BEMF voltage permits a small undriven period of the high side FET and the low side FET. The better the zero-crossing moment of the phase current and the zero-crossing moment of the BEMF are aligned the smaller the undriven period may be. The width of the undriven period may be adapted depending on the circumstances (e.g. the motor characteristics, the motor rotational speed). In embodiments of the present invention the width of the undriven period is longer when the motor is running at low speed than when it is running at high speed since at high speed the BEMF is larger and less sampling is required. In embodiments of the present invention the width of the undriven period is varying between 3 PWM periods and 60 PWM periods. In embodiments of the present invention the length of a PWM period is 50 μs. It is an advantage of embodiments of the present invention that the energy taken out of the system because of the undriven period can be limited as the undriven period can be relatively small.

It is an advantage of embodiments of the present invention that the driving waveform can be adjusted for any of the following dynamically changing parameters: rotor speed, loaded torque on the shaft, supply voltage, temperature. The required processing power for calculating the zero-crossing moment of the phase current is limited when comparing with other methods where for example a complete reconstruction of the phase current is required. Therefore it is an advantage of embodiments of the present invention that a higher dynamic behaviour can be obtained with regard to changing external parameters.

In a method according to embodiments of the present invention, determining the zero crossing moment T2 of the back-electromotive force voltage of the phase may comprise filling a back-electromotive force voltage table with the measured back-electromotive force voltages sampled during the undriven period of the phase.

It is an advantage of embodiments of the present invention that the back-electromotive force voltage is stored for a sequence of measurements as this allows to better determine the zero-crossing moment of the back-electromotive force voltages. Indeed, storing the back-electromotive force voltages allows to average out noise artefacts occurring at the zero crossing of back-electromotive force voltages.

In a method according to embodiments of the present invention, at least one of the driving waveforms may be pulse width modulated. It is an advantage of embodiments of the present invention that the methods can be applied for pulse width modulated driving waveforms as this allows to control the power transferred to the rotor using pulse width modulation.

In a method according to embodiments of the present invention, the total current may be measured by using a shunt resistor. This allows the phase currents to be reconstructed based on these total current measurements.

In a third aspect, the present invention provides a current monitoring device for determining the phase current direction and zero-crossing moment T1 of the phase current in a sinusoidally controlled brushless direct current motor. The brushless direct current motor comprises a coil per phase, wherein the phase of the brushless direct current motor is driven by a half bridge driver comprising a high side field effect transistor and a low side field effect transistor. The current monitoring device comprises:

a drain source voltage monitoring device for monitoring the drain source voltage over the field effect transistors, and a processing device arranged for determining the phase current direction, and for determining the moment the phase current changes direction, thus identifying the zero-crossing moment of the phase current.

In a fourth aspect, the present invention provides a device for driving a sinusoidally driven brushless direct current motor. The brushless direct current motor comprises a coil per phase, wherein the phase of the brushless direct current motor is driven by a half bridge driver, wherein the half bridge driver comprises a high side field effect transistor and a low side field effect transistor. The device for driving the sinusoidally driven BLDC motor comprises:

a current monitoring device according to embodiments of the third aspect of the present invention, a back-electromotive force voltage measurement and analysis unit for measuring the back-electromotive force voltage, determining the zero-crossing moment T2 of the back-electromotive force voltage, and a synchronization unit for time shifting the driving waveform such that the phase current and the back-electromotive force voltage are aligned.

Advantages of embodiments of the third and fourth aspect of the present invention are analogous to advantages of corresponding method features, and are not repeated here for the sake of conciseness.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other aspects of the invention will be apparent from and elucidated with reference to the embodiment(s) described hereinafter, referring to the drawings as appropriate.

Figure 1:
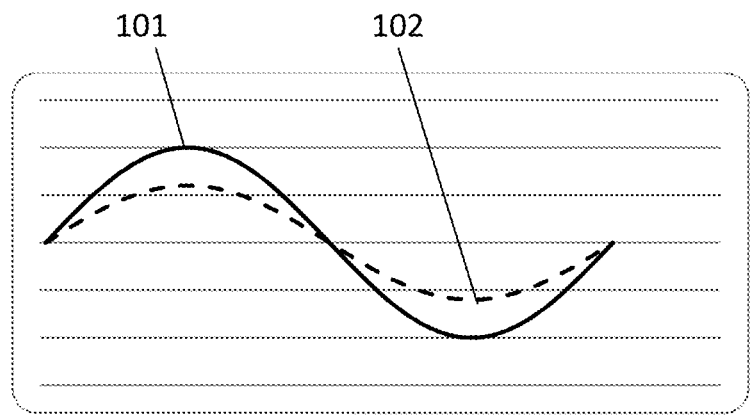
FIG. 1 illustrates the phase current aligned with the BEMF voltage.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 2:
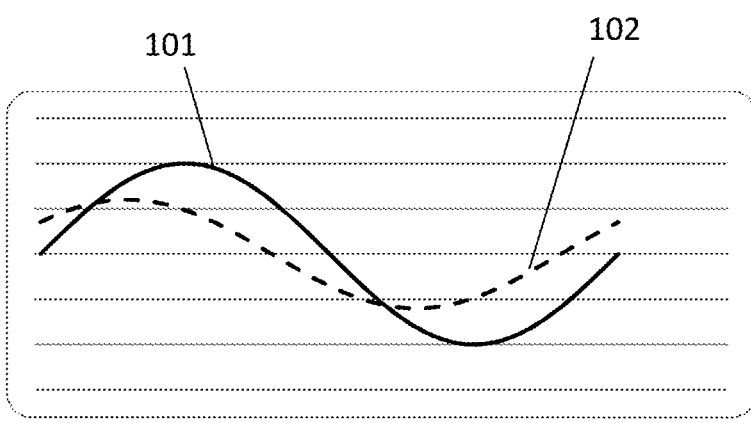
FIG. 2 and FIG. 3 illustrate a delay between the phase current and the BEMF voltage.
Figure 3:
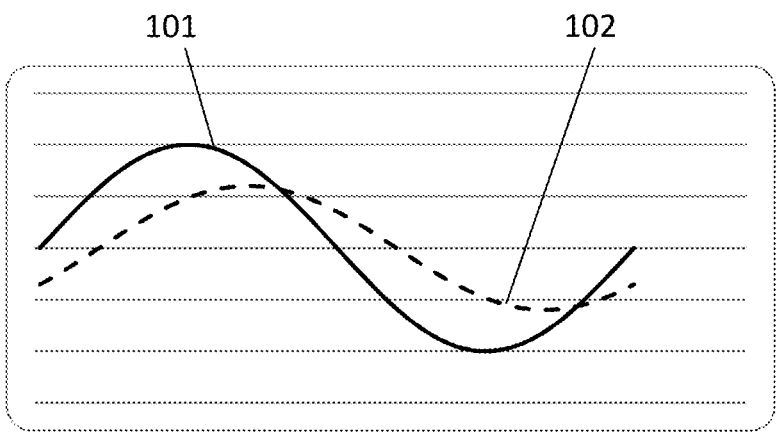

Turning now to FIGS. 1 to 3, the relationship between the back EMF voltage 102 and the phase current 101 of a phase A of a BLDC motor is shown. In the case of a 3 phase BLDC motor, there will be two further phases B, C each having a like back EMF 102 and phase current 101 relationship. In the example of FIG. 1, the back EMF 102 is synchronised with the phase current 101; in FIG. 2, the back EMF 102 lags the phase current 101 and in FIG. 3 the back EMF 102 leads the phase current 101.

Since maximum operational efficiency occurs when the back EMF 102 and phase current 101 are synchronised (as in FIG. 1), the present invention will be described in terms of achieving such situation.

Figure 4:
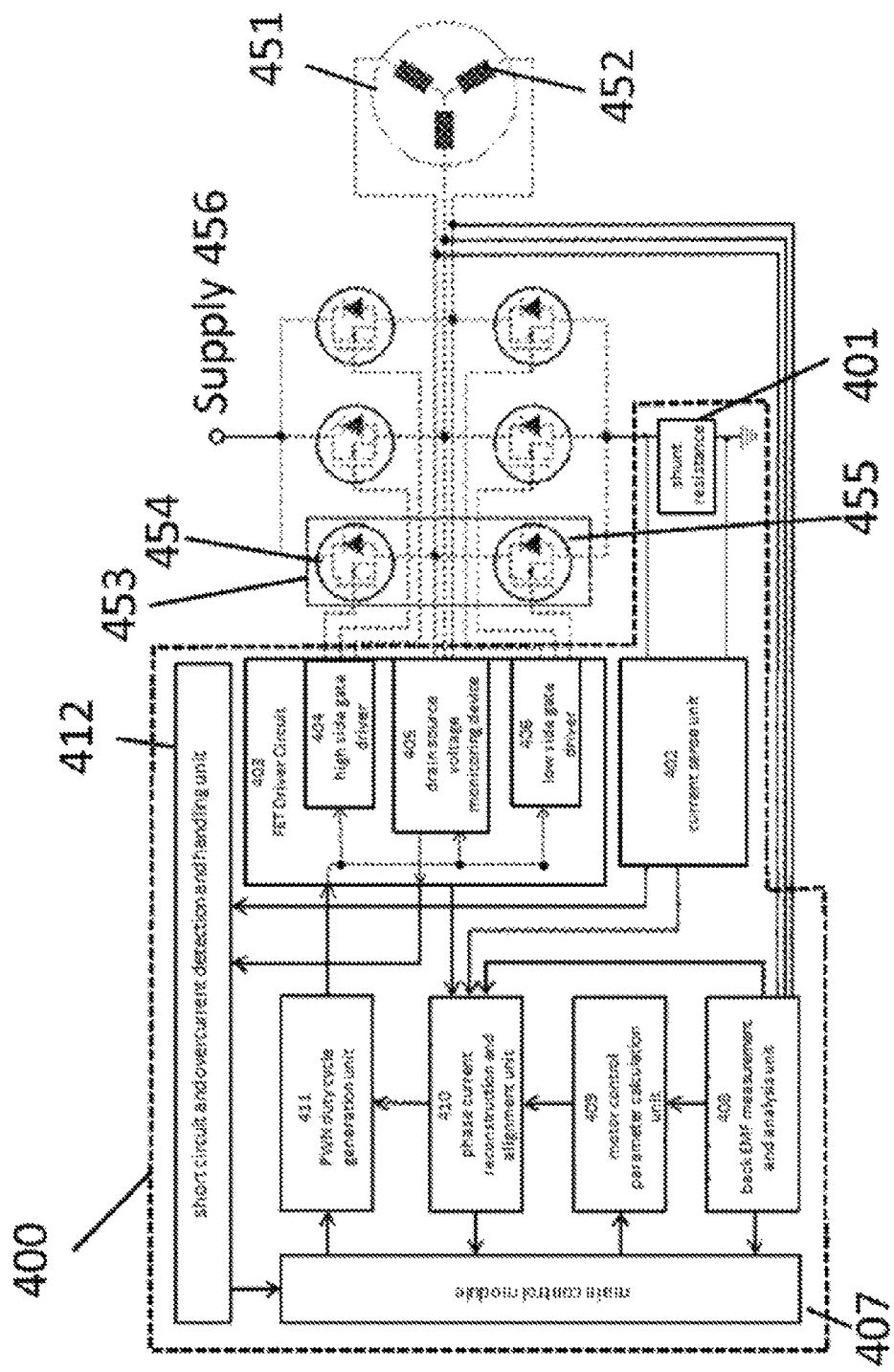
FIG. 4 illustrates building blocks of a device for driving a sinusoidally driven brushless direct current motor as well as driving circuitry and a BLDC motor in accordance with embodiments of the present invention.

Turning to FIG. 4, a three phase BLDC motor 451 is illustrated, provided with half bridge drivers 453 and a device 400 for controlling and driving the half bridge drivers. The motor comprises a coil 452 per phase, and each phase of the BLDC motor is driven by a half bridge driver 453. The half bridge drivers 453 enable the phases to be driven by a desired voltage profile at a desired Pulse Width Modulation (PWM) duty cycle. The application of a driving profile to the half bridge drivers 453 is controlled by six driving transistors, a high side field effect transistor 454 and a low side field effect transistor 455 for each half bridge driver 453, operable in response to a PWM duty cycle generation unit 411 to apply the driving profile at a desired PWM duty cycle. In embodiments of the present invention, the supply voltage 456 for the high side and low side field effect transistors is provided by a battery.

The driving profile is generated by a main control module 407, and its amplitude and duration are controlled by a motor control parameter calculation unit 409. The main control module 407 provides, based on speed/torque requirements of the motor 451, information to the PWM duty cycle generation unit 411, such as the current wave form profiles to be applied to the motor 451. The PWM duty cycle generation unit 411 then provides information about the switching sequence to the FET Driver Circuit 403, more particularly to the high side gate driver 404 and the low side gate driver 406 for correspondingly driving the driving transistors 454, 455 of the half bridge drivers 453. The high side gate driver 404 and low side gate driver 406 are driven according to the switching sequence, and provide switching information to the high side field effect transistors 454 and low side field effect transistors 455, respectively, which are thus driven with a driving waveform according to the applied switching sequences.

Figure 8:
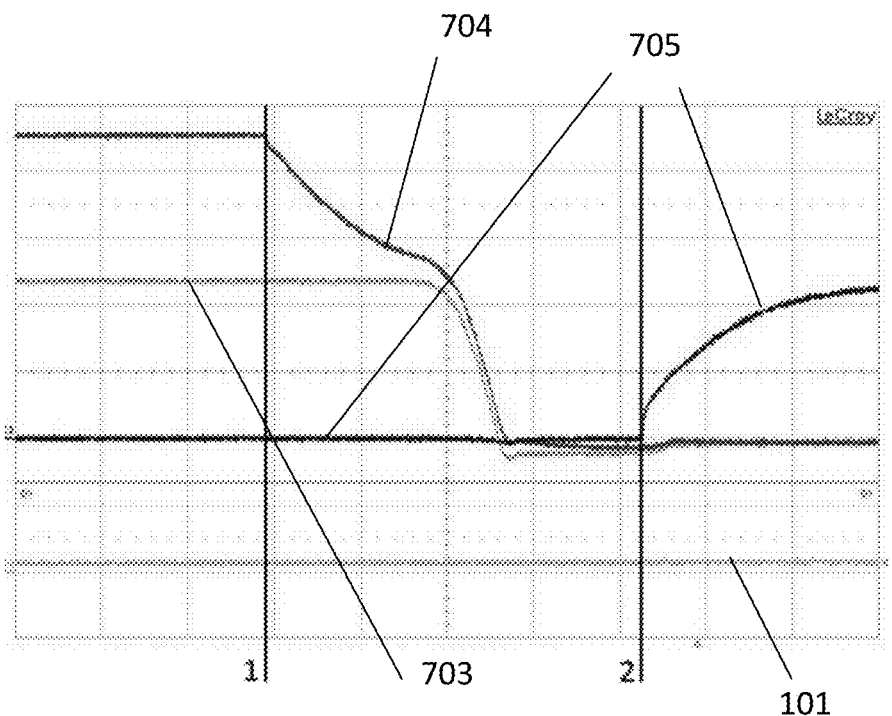
FIG. 8 illustrates the phase voltage behaviour when switching from high side to low side in the presence of a positive current in accordance with embodiments of the present invention.
Figure 9:
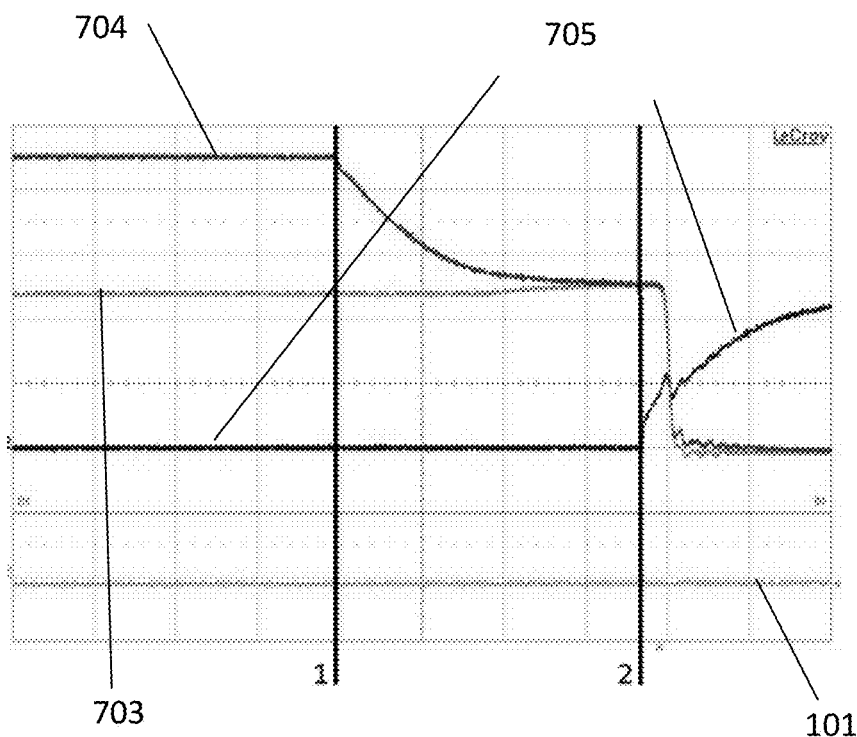
FIG. 9 illustrates the phase voltage behaviour when switching from high side to low side in the presence of a negative current in accordance with embodiments of the present invention.

A drain source voltage monitoring device 405 observes for each power FET 454, 455 in the high side and in the low side the drain source voltages and will interpret them by using the information of the PWM duty cycle generation unit 411, as explained below with reference to FIG. 8 and FIG. 9.

The information of the drain source monitoring device 405 is provided to a short circuit and overcurrent detection and handling unit 412.

Furthermore, a current sense unit 402 is provided for determining the current through a shunt resistance 401 connected between ground and the low side FETs 455. This current sense unit 402 provides its current measurements to the short circuit and overcurrent detection and handling unit 412 and to a phase current reconstruction and alignment unit 410. In embodiments of the present invention one shunt resistor 401 measures the sum of all currents through the low side FETs 455. One shunt resistor 401 for measuring the sum of all currents instead of a shunt resistor per phase has the following advantages: only one shunt resistor is needed which decreases the system cost, the dissipated power is reduced, and therefore the heating of the module is also reduced. The phase reconstruction and alignment unit reconstructs the phase current based on the measurements of the current through the shunt resistor 401 and based on the switching moments of the high side FETs 454 and the low side FETs 455. In embodiments of the present invention the current through the shunt resistor 401 is sampled at dedicated moments during which the current is only flowing through one phase. In embodiments of the present invention the phase reconstruction and alignment unit determines where the current flows at a certain moment in time. In embodiments of the present invention the zero crossing of the phase current and the zero crossing of the BEMF are aligned.

The three BLDC motor phases are connected to a back EMF measurement and analysis unit 408. The back EMF measurement and analysis unit is operable to measure the voltage of a motor phase while it is undriven in order to determine the back EMF zero crossing point. This thereby enables the rotor position and speed to be estimated. The information about the rotor position and the motor speed is provided by the back EMF measurement and analysis unit 408 to the main control module 407.

In the main control module 407, a speed regulator/torque regulator compares and regulates the achieved parameters, e.g. motor speed and/or torque, to the requested parameters. The rotor position information is also provided to the motor control parameter calculation unit 409. In the motor control parameter calculation unit 409 for instance the lead angle might be calculated, which may be used for adjustment in phase angle of the driving voltage profile.

The phase current reconstruction and alignment unit 410 restores the phase currents 101 out of the current samples from the current sense unit 402 and from the PWM controlling scheme of the PWM duty cycle generation unit 411. The reconstructed phase currents might further be used by the main control module 407. Furthermore the phase current reconstruction and alignment unit 410 uses the information of the drain source voltage monitoring device 405 and determines a current direction indicator (CDI).

According to embodiments of the present invention, based on the phase current direction indicator the zero-crossing moment of the phase current 101 can be determined and that is used to align the stored current wave form profiles of the PWM duty cycle generation unit 411 towards the BEMF voltage from the BEMF measurement and analysis unit 408, for instance taking into account the lead angle determined by the motor control parameter calculation unit 409.

In embodiments of the present invention the BLDC motor is driven conform a sinusoidal commutation mode. In sinusoidal commutation mode one motor phase can be set to ground, while the both remaining motor phases are driven with a PWM switching scheme to generate the sinusoidal current shape (space vector modulation).

For measuring a correct BEMF voltage it is required that the phase current 101 is zero while measuring the phase voltage 703. If the phase current 101 is not zero when interrupting the driving waveform this will cause the current to run out of the coil during the freewheel time. Therefore it is advantageous to measure the BEMF voltage at the zero-crossing moment of the phase current 101.

However, in the sinusoidal commutation mode driving scheme, no motor phase is ever having an undriven period, during which the BEMF voltage can be measured. Therefore in embodiments of the present invention an undriven period is provided in the driving waveform to enable the BEMF voltage measurement. This undriven period is also called the "BEMF voltage measurement window".

The BEMF voltage measurement window leads to a discontinuity of the current. This discontinuity can generate audible noise and can deteriorate the EMC behaviour of the system, if the BEMF measurement is done at an unpropitious moment.

Figure 5:
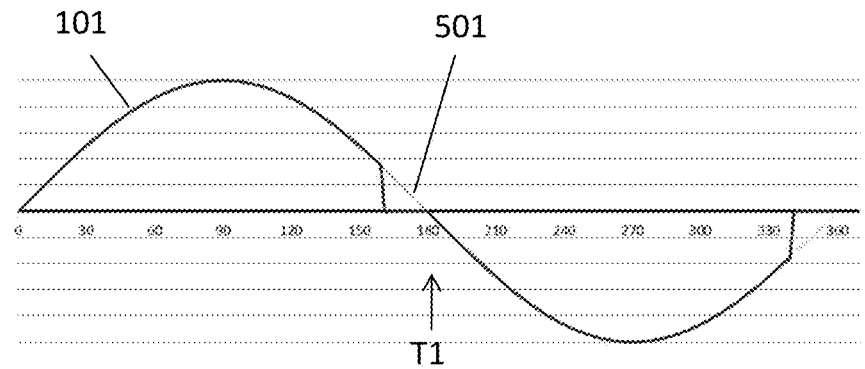
FIG. 5 illustrates non-ideal moments for opening the BEMF measurement window.
Figure 5:
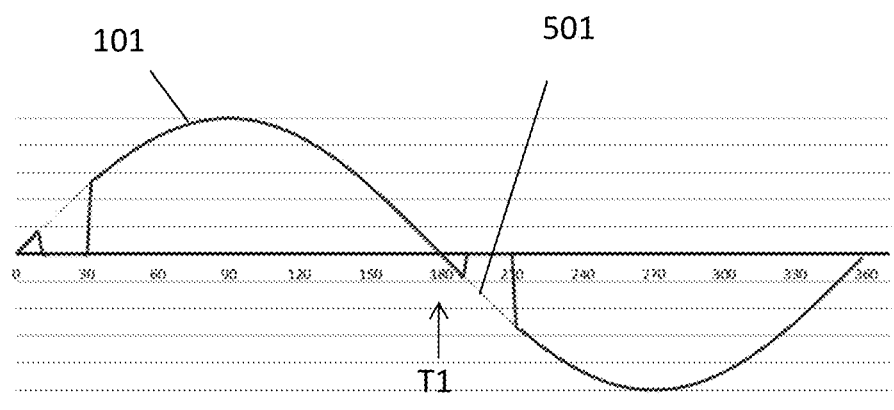
Figure 6:
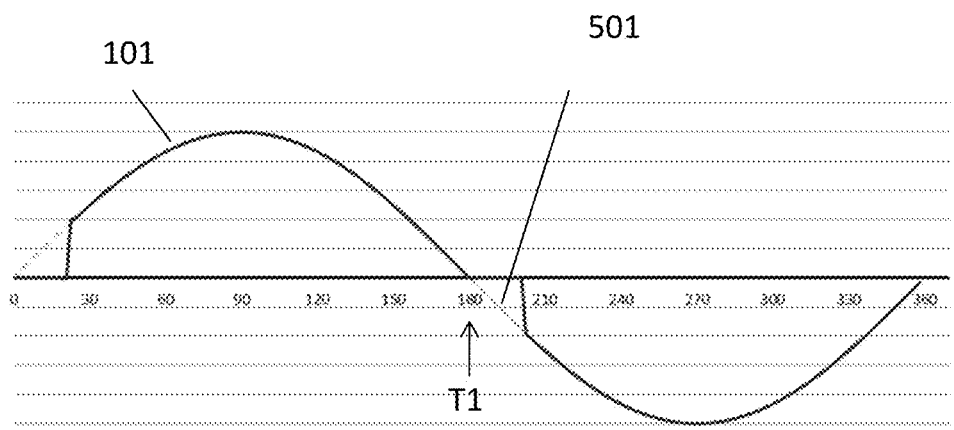
FIG. 6 illustrates the ideal moment for opening the BEMF measurement window in accordance with embodiments of the present invention.

This is illustrated with respect to FIG. 5 and FIG. 6. FIG. 5 illustrates a first and a second graph where the BEMF measurement window is either opened too early (in the first graph—before the zero crossing moment T1) or too late (in the second graph—after the zero crossing moment T1). The curve 501 in FIG. 5 and FIG. 6 represents the ideal phase current. This is the phase current if the BEMF measurement window would not be opened. In that case no discontinuities are present in the phase current. When opening the BEMF measurement window, however, discontinuities in the phase current occur. The curve 101 illustrates the phase current when an undriven period is introduced in the phase for measuring the BEMF voltage.

In the first graph of FIG. 5, the BEMF voltage measurement window is opened too early. The current in the motor phase will continue to flow and will shoot into one bulk diode of a given power transistor 454, 455. This will lead to a so called fly back voltage pulse in the measurement window, what finally will disturb the BEMF measurement, resulting in a BEMF signal that is not reliable.

In the second graph of FIG. 5, the BEMF voltage measurement window is opened too late. This results in current spikes, producing audible noise and leading to a bad EMC behaviour.

In FIG. 6 the BEMF voltage measurement window is opened at the same time as the current changes direction from positive current to negative current or vice versa. This is the optimal behaviour. At that moment, the current is zero and there are no current spikes. The loss in the produced torque can almost be neglected.

The ideal timing of the driving waveforms can be defined for a given load condition (motor speed, torque, voltage etc.). However, as BLDC motors are inductive loads, the optimal timing will change with the changing load conditions. When load conditions are changing the timing of the driving waveforms should be adapted such that the BEMF measurement window again coincides with a zero crossing of the current.

Therefore it is necessary to adapt the timing dynamically while the motor is running. Therefore it is necessary to know the zero crossing moment of the current as well as the zero crossing moment of the BEMF voltage.

The current direction cannot be measured directly. In accordance with embodiments of the present invention, this information is obtained from another measurement, namely from the measurement of the drain source voltage of the power transistors 454, 455. This is explained in more detail with reference to FIG. 7.

The current direction can indirectly be observed by the drain source voltage monitoring inside the FET driver circuit, as performed by the VDS monitoring circuit 405. An embodiment of such VDS monitoring circuit is illustrated in more detail in FIG. 7.

In embodiments of the present invention a first drain source voltage comparator 701 for the high side and a second drain source voltage comparator 702 for the low side are used for monitoring the phase (drain source) voltage 703. The two comparators 701, 702 deliver information about the phase voltage 703.

In embodiments of the present invention, error conditions may be triggered if the drain source voltage is outside a pre-defined condition (error case—signal VDS Error).

In typical situations, where the drain source voltage is not outside a pre-defined condition, the comparators 701, 702 deliver information about the phase current flowing either in positive or in negative direction. This information can be used to determine the phase current direction and eventually the zero-crossing moment of the phase current. Based on this information, a current direction indicator (CDI) flag may be set.

In embodiments of the present invention the CDI flag is a current direction indication bit, which is set depending on the direction of the current. As an example:
  If the phase current is negative, this current direction indication bit is set to logic 0,
  If the phase current is positive, this current direction indication bit is set to logic 1.

There are several possible conditions for the drain source voltage comparators switching from high side active to low side active and reverse with positive current or negative current flowing, etc.

Only two examples are described in somewhat more detail hereinbelow, referring to FIG. 8 and FIG. 9. The examples in these drawings illustrate the measured gate voltages and phase voltage 703 when switching from high side active to low side active in two situations: a first situation when the phase current 101 is positive, and a second situation when the phase current 101 is negative.

In the first situation the high side gate driver 404 is switched off and the low side gate driver 406 is switched active while the phase current 101 is positive. At moment '1' in FIG. 8 the high side gate driver 404 output is set from active to inactive and the high side FET 454 starts to switch off. The phase voltage 703 also starts to drop after the high side FET 454 goes from saturation into the linear region. The gate voltage 704 of the high side FET 454 and the phase voltage 703 both fall after a while below 0 V. At this moment, both the high side FET 454 as well as the low side FET 455 are turned off and the drain source voltage comparator 701, 702 detects the actual phase voltage 703. The phase voltage 703 is already below battery voltage and the current direction indication bit indicates 1(positive current). In the scope plot of FIG. 8 this can be seen by the fact that the phase current 101 is above the closest grid line of the scope whereas in FIG. 9 the phase current 101 is below the same grid line. At moment '2' the low side gate driver 406 output is set to active and the low side FET 455 starts to turn on (see low side gate voltage 705 in FIG. 8).

In the second situation the high side gate driver 404 is switched off and the low side gate driver 406 is switched active while the phase current 101 is negative. At moment '1' the high side gate driver output 404 is set from active to inactive, and the high side gate voltage 704 drops to battery voltage but not to 0 V. In fact here the phase current 101 is negative and it is driving the phase voltage 703 to battery voltage because of the inductance of the motor coil. The phase current 101 is freewheeling. At this moment both the high side FET 454 as well as the low side FET 455 are in tri-state and the drain source voltage comparator 701, 702 detects the actual phase voltage. As the phase voltage 703 is still on battery voltage level, the current direction indication bit is set to 0 indicating that the current is negative. At moment '2' the low side gate driver output 406 is set to active and the low side FET 455 turns on (see low side gate voltage 705 in FIG. 9) and the high side gate voltage 704 and the phase voltage 703 are pulled to ground.

In accordance with embodiments of the present invention, the zero crossing moment of the current can be identified by monitoring the drain source voltage of the power transistors 454, 455. From the drain source voltages of the power transistors 454, 455, the current direction can be derived.

The phase current zero-crossing moment T1 on its turn can be derived from the current direction as being the moment when the phase current 101 changes direction. In embodiments of the present invention the subsequent current directions may be stored in a table, referred to as the current direction indication (CDI) table. The zero-crossing moment of the phase current 101 can be determined by inspecting this table. Using a table allows to average out noise artefacts occurring at the zero crossing of the phase current.

It is an advantage of embodiments of the present invention that the current indication signal, for instance current direction indication bit, can be used to determine the zero-crossing moment of the phase. This is an advantage because it is a computation inexpensive way of determining the zero-crossing of the phase current compared to methods where the complete phase currents need to be rebuilt.

It is an advantage of embodiments of the present invention that knowing the phase current zero-crossing moment allows to find the optimal position for the BEMF voltage measurement. Knowing the phase current zero-crossing moment also allows to align the phase current 101 in an easy way towards the BEMF voltage in order to drive the motor in an energy optimal way.

Figure 7:
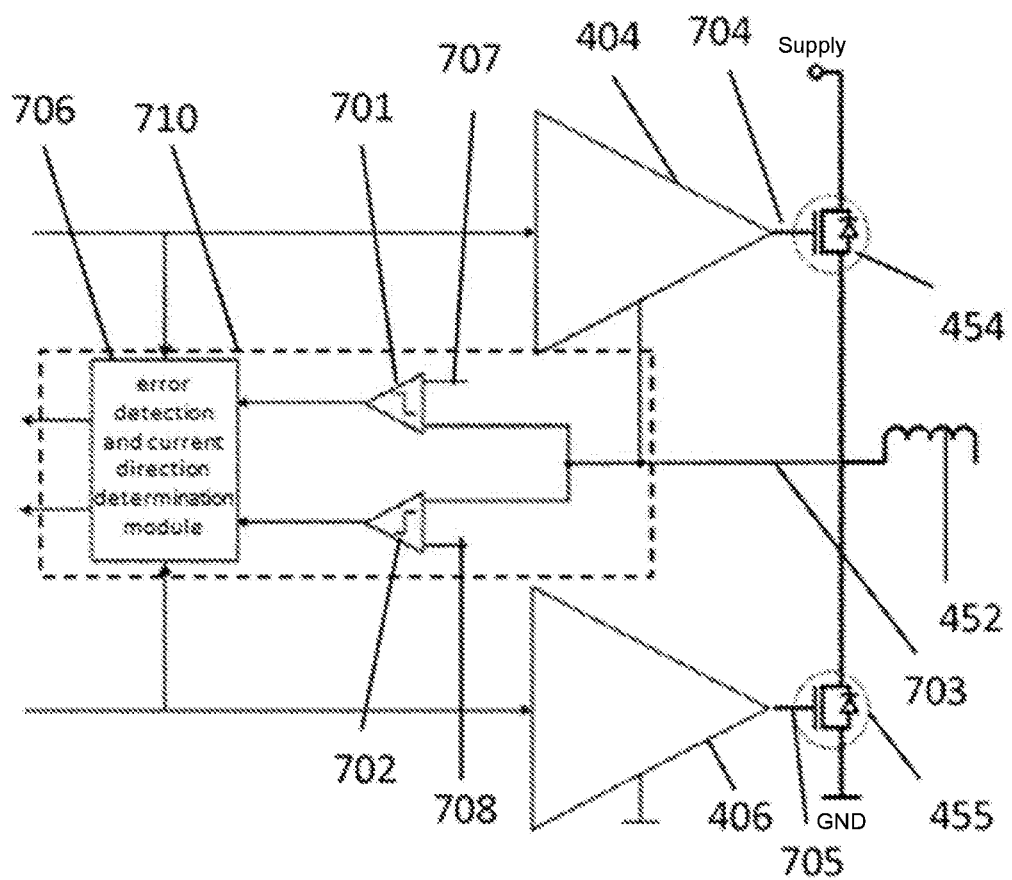
FIG. 7 illustrates the current monitoring device in accordance with embodiments of the present invention.

Error detection and the current direction determination is implemented in the module 706 in FIG. 7. Therefore it uses the output of the drain source voltage comparator 701 of the high side and the output of the drain source voltage comparator 702 at the low side. In embodiments of the present invention the reference voltage level 707 for the high side and the reference voltage level 708 for the low side are programmable. In embodiments of the present invention the reference voltage level 707 for the high side can be varied to a level between the battery voltage (supply voltage 456) and the battery voltage minus 2.5 V. In embodiments of the present invention the reference voltage level 708 for the low side can be varied to a level between 0 V and 2.5 V. It is an advantage of embodiments of the present invention that the reference voltage levels can be adapted for drain source voltage monitoring and for error detection.

In one aspect, the present invention relates to a method 1010 for determining the direction of the phase current 101 in a sinusoidally driven BLDC motor 451 and for determining the zero-crossing moment T1 of this phase current 101. Embodiments of the present invention can be used for driving a sinusoidally driven BLDC motor, an exemplary BLDC motor being shown in and described with respect to FIG. 4.

Figure 10:
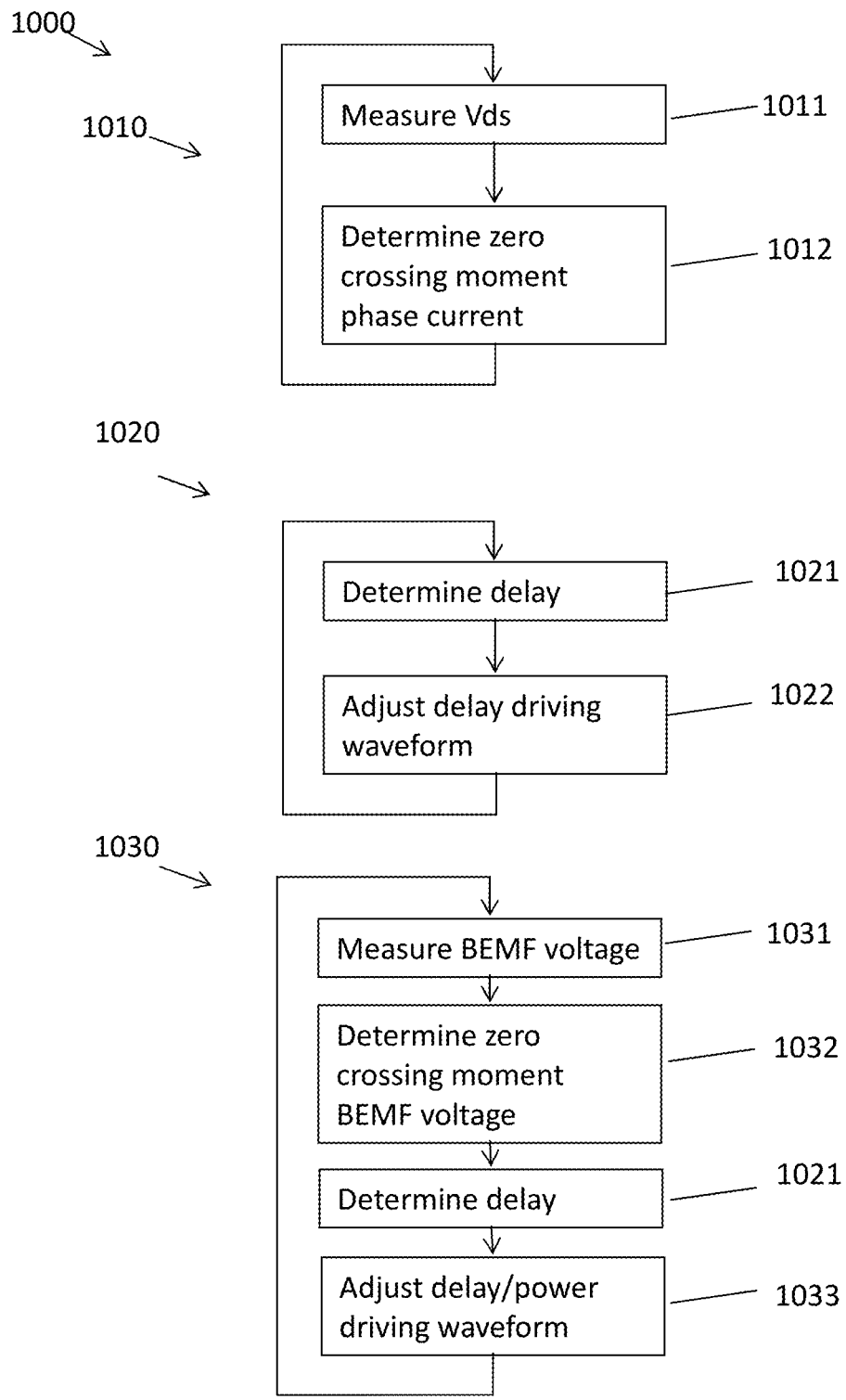
FIG. 10 illustrates steps for determining the zero-crossing of the phase current as well as steps for driving BLDC motors in accordance with embodiments of the present invention.

FIG. 10 shows the two steps, according to embodiments of the present invention, of a method 1010 for determining the zero crossing moment T1 of the phase current 101. In the first step 1011 of the method 1010 the drain source voltages over the high side field effect transistor 454 and over the low side field effect transistor 455 are measured. In the second step 1012 the current direction is determined from these drain source voltages, and when the current changes direction the zero crossing timestamp T1 is noted.

FIG. 10, sub-method 1010, also shows a loop indicating that the measurements are done continuously. How the loop is closed, however, can differ between embodiments. Different steps might be included and not each step needs to be executed in every loop.

Figure 11:
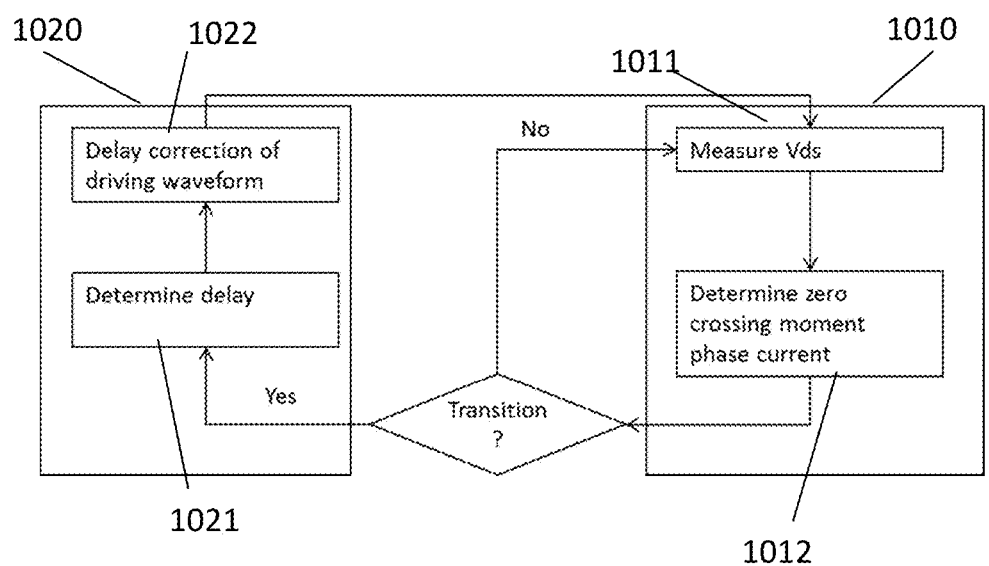
FIG. 11 illustrates steps for determining the zero-crossing of the phase current as well as steps for driving BLDC motors in accordance with embodiments of the present invention.
Figure 12:
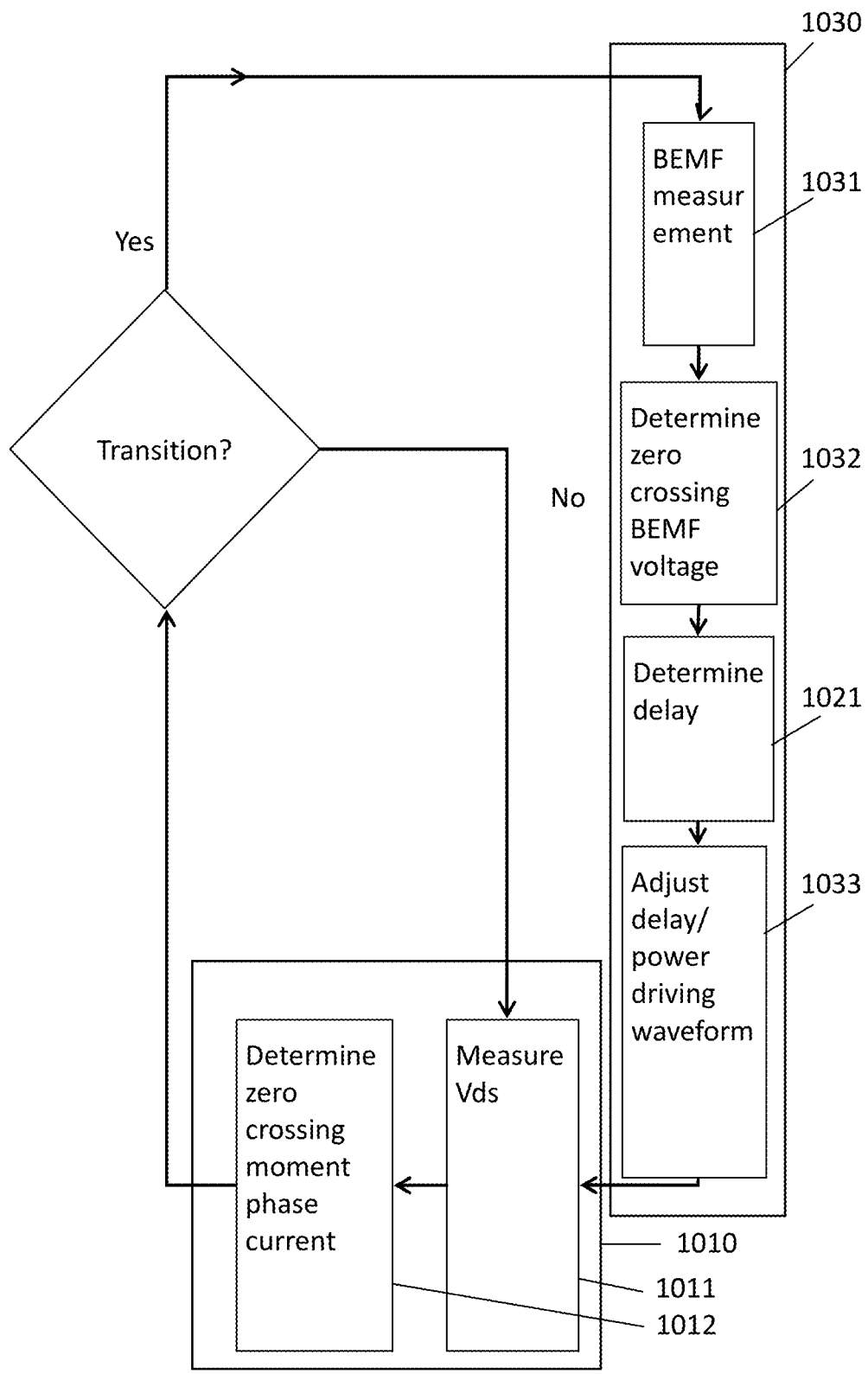
FIG. 12 illustrates steps for determining the zero-crossing of the phase current as well as steps for driving BLDC motors in accordance with embodiments of the present invention.

FIG. 10 also illustrates a broader method 1000 for sinusoidally driving a BLDC motor 451. The method 1000 comprises several steps which may be executed consecutively or in parallel. Embodiments are illustrated in FIG. 10, FIG. 11 and FIG. 12.

In a first step (not illustrated) a driving waveform is applied to each field effect transistor (454, 455) of each phase. Each of the driving waveforms has an undriven period, which optimally has a timing as explained with respect to FIG. 6.

In a following step 1010 the zero crossing moment T1 of the phase current 101 is determined based on the measured 1011 drain source voltages over the high and low side field effect transistors 454, 455, and determining 1012 therefrom a current direction indication, which indicates a zero crossing moment when it indicates the current direction switches. Steps 1011 and 1012 may be running in a parallel process 1010 (as in FIG. 10)or may be integrated with other method steps (e.g. FIG. 11 and FIG. 12).

If the zero-crossing moment T2 of the back-electromotive force voltage T2 is available, as in sub-method 1020, in step 1021 the delay between the zero crossing moment T1 of the current 101 through the coil 452 and the zero crossing moment T2 of the back-electromotive force voltage over the coil 452 is determined This delay is used in step 1022 for adjusting 1022 the driving waveforms with the delay such that the zero crossing of the phase current substantially corresponds with the zero crossing of the back-electromotive force voltage, as illustrated in FIG. 1. Steps 1021 and 1022 may be running in a parallel process 1020 (FIG. 10) or may be integrated with other method steps (e.g. FIG. 11 and FIG. 12).

If the zero-crossing moment T2 of the back-electromotive force voltage T2 is not yet available, as in sub-method 1030, in step 1031 the BEMF voltage is measured during an undriven period of the phase.

In step 1032 the zero crossing moment T2 of the BEMF voltage is determined based on the measured the BEMF voltages. This may be done in any suitable way. In embodiments of the present invention the zero-crossing moment of the BEMF voltage is calculated through interpolation from BEMF samples. In alternative embodiments, the sampled BEMF voltages may be stored in a BEMF voltage table. Interpolation of the samples in the BEMF voltage table allows to determine the zero-crossing momentT2 of the BEMF voltage.

In step 1021 the delay between the zero crossing moment T1 of the current through the coil and the zero crossing moment T2 of the back-electromotive force voltage over the coil 452 is then determined, e.g. calculated. In step 1033 the driving waveforms are adjusted with the delay such that the zero crossing of the phase current 101 substantially corresponds with the zero crossing of the back-electromotive force voltage, and/or the power of the driving waveforms is adjusted. Steps 1031 and 1032, 1021 and 1033 may be running in a parallel process 1030 (FIG. 10) or may be integrated with other method steps (e.g. FIG. 12).

The sub-method 1010 for determining the zero-crossing moment of the phase current 101, and any of sub-methods 1020, 1030 for adjusting the delay between zero-crossing of BEMF voltage and phase current 101, can be applied in parallel as illustrated in FIG. 10.

The embodiment of FIG. 11 illustrates the determination 1010 of the zero-crossing moment of the phase current 101 being carried out, by measuring 1011 the drain source voltage of the power transistors 454, 455. This determination is looped as long as no zero-crossing of the phase current 101 is detected. As soon as a zero-crossing is detected, a delay between the zero-crossing moment T1 of the phase current 101 and the zero-crossing moment T2 of the BEMF voltage is determined 1021; and this delay is used for correcting 1022 the driving waveform.

The embodiment illustrated in FIG. 12 is similar to the embodiments illustrated in FIG. 11, but furthermore includes the sub-method 1030 of BEMF measurement and zero-crossing moment T2 determination.

Figure 13:
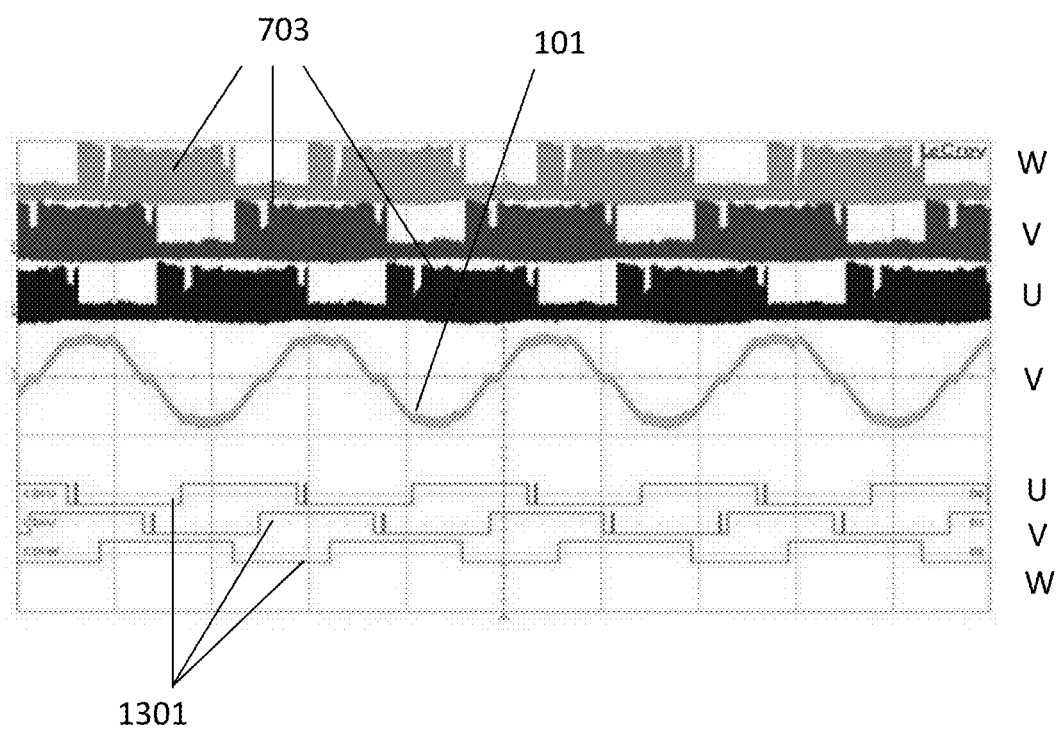
FIG. 13 illustrates the current direction indicator for each phase in combination with the phase voltage for each phase and in combination with the phase current for one phase in accordance with embodiments of the present invention.
Figure 14:
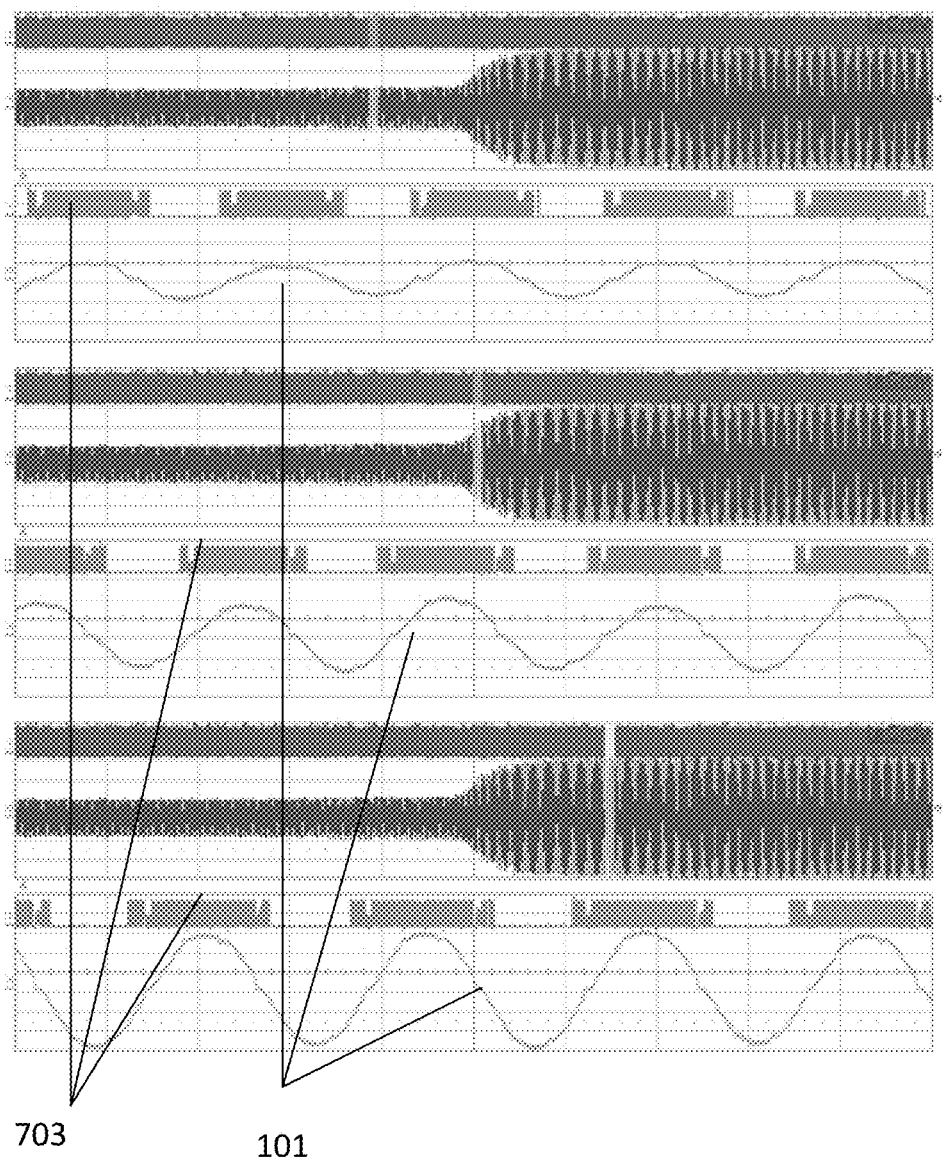
FIG. 14 illustrates the phase current and the BEMF voltage measurement window under changing load conditions in accordance with embodiments of the present invention.

FIG. 13 shows the current direction indication bit 1301, and the phase voltage 703 for every motor phase U, V, W. The undriven periods are clearly visible in the phase voltage 703. The phase current 101 for phase V is also shown. The undriven periods are at the same moment as the zero-crossing moments of the phase current 101 as can be seen from the motor phase current line 101 and from the current direction indication line 1301. FIG. 13 thus shows the optimal condition for opening the BEMF voltage measurement window. At the moment where the phase 101 current crosses the zero line, the BEMF voltage measurement window is opened. The driving waveform (e.g. sine wave table) offset correction can be done in every motor state and in every motor phase. A motor state is the time between two motor commutations. It is an advantage of embodiments of the present invention that it allows the adjustment software to react dynamically very fast on changing load conditions. This is illustrated in FIG. 14 showing the phase voltage 703 and the phase current 101 for one phase. While the external load of the BLDC motor 451 increases (the current amplitude rises as well) the BEMF measurement window is always kept at the zero crossing of the motor phase current (optimal position). It is therefore an advantage of embodiments of the present invention that the method 1000 is very robust under hard environments and changing load conditions. Hard environments may for example occur in automotive applications where the supply voltage 456 can change between 5 V and 45 V and/or where the temperature can vary between −40° C. and +150° C. This implies that the motor current is not only dependent on the motor load and speed but also on the environmental conditions. It is an advantage of an algorithm according to embodiments of the present invention that it is robust against such variations. Embodiments of the present invention enable starting an Engine Cooling Fan of 600 W from 0 to maximum speed in 5.6 seconds whereas in prior art solutions for the same fan at least the double of this time was required. Embodiments of the present invention applied in an oil pump responded to changing loads of 70 bar in less than 150 ms whereas this was less reliable in prior art solutions. It is an advantage of embodiments of the present invention that an alignment between the BEMF voltage and the phase current leads to an energy efficiency increase. In embodiments of the present invention an energy saving can be realised between 5% and 15% compared to prior art solutions.

In embodiments of the present invention a phase current reconstruction and alignment unit 410 (FIG. 4) uses the current direction indication bit information and shifts the stored driving waveform (e.g. sine wave tables) of the PWM duty cycle generation unit 411 with an offset either to the left side or to the right side depending on the delay between the zero-crossing moment of the phase current and the zero-crossing moment of the BEMF voltage. In FIG. 1 the phase current 101 and the BEMF voltage 102 are perfectly in sync. In this situation the BLDC motor 451 runs in an energy efficient mode. In FIG. 2 and FIG. 3 a delay is present between the BEMF voltage 102 and the phase current 101. In the first case the BEMF voltage 102 is delayed in the second case it is the phase current 101.

In embodiments of the present invention the driving waveform is shifted such that the phase current 101 and the BEMF voltage 102 are in sync. This shift is done with a simple addition of a positive or negative variable offset. This operation is very fast with minimum calculation efforts. By doing that, the BEMF voltage measurement window is always placed at that moment, when the phase current changes its polarity, thus at the moment when the phase current is nearly zero. Therefore it is an advantage of embodiments of the present invention that changes in load or changes in speed of the motor are regulated out. Moreover it is an advantage of embodiments of the present invention that transient effects are reduced since the undriven period is at the zero crossing of the phase current 101. Reducing the transient effects results in less EMC disturbances and in less acoustic noise. By aligning the zero-crossing moment of the phase current 101 with the zero crossing of the BEMF voltage also the maximum of the phase current itself will be aligned towards the maximum of the BEMF phase voltage. This leads to an energy efficient motor driving as the total current consumption (because of the optimal presence of the BEMF) is brought to a minimum.

Figure 15:
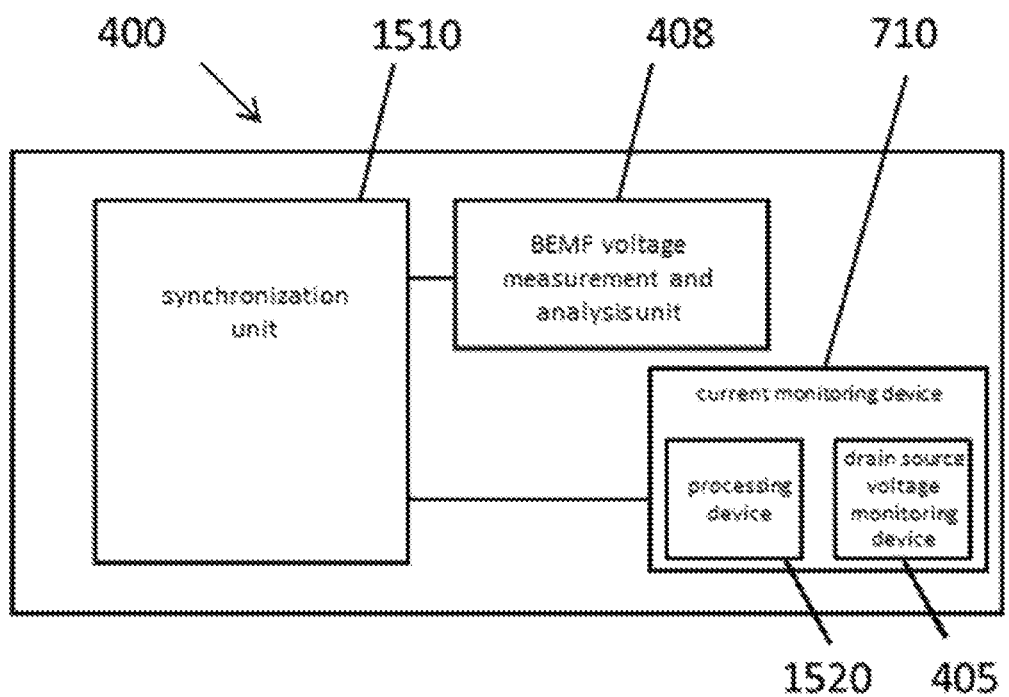
FIG. 15 illustrates the building blocks of a device for driving a sinusoidally driven brushless direct current motor in accordance with embodiments of the present invention.

In an aspect, illustrated in FIG. 15, the present invention relates to a current monitoring device 710 for determining the phase current 101 direction and zero crossing moment T1 of the phase current in a sinusoidally controlled BLDC motor 451. The BLDC motor 451 comprises a coil 452 per phase. The phase of the BLDC motor 451 is driven by a half bridge driver 453, wherein the half bridge driver comprises a high side field effect transistor 454 and a low side field effect transistor 455. The current monitoring device 710 comprises a drain source voltage monitoring device 405 for monitoring the drain source voltage over the field effect transistors 454, 455. It also comprises a processing device 1520 for determining the phase current 101 direction and for determining the moment the phase current changes direction thus identifying the zero-crossing moment T1 of the phase current 101.

In a further aspect, the present invention relates to a device 400 for driving a sinusoidally driven BLDC motor 451. The device 400 comprises a current monitoring device 710 for determining the zero-crossing moment of the phase current 101. The device 400 moreover comprises a BEMF voltage measurement and analysis unit 408 for measuring the BEMF voltage, and for determining the zero-crossing moment of the BEMF voltage T2. The device also comprises a synchronization unit 1510 for time shifting the driving waveform such that the phase current 101 and the BEMF voltage are aligned.

The invention claimed is:

1. A method for determining a phase current direction and a zero-crossing moment of the phase current in a sinusoidally controlled brushless direct current motor, the brushless direct current motor comprising a coil per phase, wherein the phase of the brushless direct current motor is driven by a half bridge driver comprising a high side field effect transistor and a low side field effect transistor, the method comprising the following steps:
    measuring the drain source voltage over the high side field effect transistor and low side field effect transistor,
    determining the zero crossing moment of the phase current by determining the current direction based on the measured drain source voltages and by determining the moment the current changes direction.

2. The method according to claim 1, wherein determining the zero crossing moment of the phase current comprises filling a current direction indication table with the current direction for each measurement.

3. A method for driving a sinusoidally driven brushless direct current motor, the brushless direct current motor comprising a coil per phase, wherein the phase of the brushless direct current motor is driven by a half bridge driver comprising a high side field effect transistor and a low side field effect transistor, the method comprising the following steps:
    applying a driving waveform to each field effect transistor of each phase wherein each of the driving waveforms has an undriven period,
    determining the zero-crossing moment of the phase current using a method according to claim 1,
    determining a delay between the zero crossing moment of the current through the coil and a zero crossing moment of a back-electromotive force voltage over the coil,
    adjusting the driving waveforms with the determined delay such that the zero crossing of the phase current substantially corresponds with the zero crossing of the back-electromotive force voltage.

4. A method according to claim 3, furthermore comprising, before the step of determining a delay between the zero crossing moment of the current through the coil and a zero crossing moment of a back-electromotive force voltage over the coil,
    measuring the back-electromotive force voltage during an undriven period of the phase,
    determining the zero crossing moment of the back-electromotive force voltage of the phase based on the measured back-electromotive force voltages.

5. The method according to claim 4, wherein determining the zero crossing moment of the back-electromotive force voltage of the phase comprises filling a back-electromotive force voltage table with the measured back-electromotive force voltages sampled during the undriven period of the phase.

6. The method according to claim 3, wherein at least one of the driving waveforms is pulse width modulated.

7. The method according to claim 3, wherein the total current is measured by using a shunt resistor.

8. A current monitoring device for determining the phase current direction and zero-crossing moment of the phase current in a sinusoidally controlled brushless direct current motor, the brushless direct current motor comprising a coil per phase, wherein the phase of the brushless direct current motor is driven by a half bridge driver comprising a high side field effect transistor and a low side field effect transistor, the device comprising:
    a drain source voltage monitoring device for monitoring the drain source voltage over the field effect transistors,
    a processing device arranged for determining the phase current direction, and for determining the moment the phase current changes direction thus identifying the zero-crossing moment of the phase current.

9. A device for driving a sinusoidally driven brushless direct current motor, the brushless direct current motor comprising a coil per phase, wherein the phase of the brushless direct current motor is driven by a half bridge driver, wherein the half bridge driver comprises a high side field effect transistor and a low side field effect transistor, the device comprising:
    a current monitoring device according to claim 8,
    a back-electromotive force voltage measurement and analysis unit for measuring the back-electromotive force voltage, determining the zero-crossing moment of the back-electromotive force voltage,
    a synchronization unit for time shifting the driving waveform such that the phase current and the back-electromotive force voltage are aligned.

* * * * *